(12) United States Patent
Gallagher et al.

(10) Patent No.: US 7,452,919 B2
(45) Date of Patent: Nov. 18, 2008

(54) CLARITY, LOW HAZE POLYMER

(75) Inventors: Thomas Gallagher, Pittsburgh, PA (US); Edwin B. Townsend, IV, Pittsburgh, PA (US)

(73) Assignee: Sunoco, Inc. (R&M), Philadelphia, PA (US)

( * ) Notice: Subject to any disclaimer, the term of this patent is extended or adjusted under 35 U.S.C. 154(b) by 442 days.

(21) Appl. No.: 10/855,922

(22) Filed: May 27, 2004

(65) Prior Publication Data

US 2005/0277719 A1 Dec. 15, 2005

(51) Int. Cl.
*C08J 11/04* (2006.01)
(52) U.S. Cl. ...................................................... 521/47
(58) Field of Classification Search ................ 521/47
See application file for complete search history.

(56) References Cited

U.S. PATENT DOCUMENTS

| | | | |
|---|---|---|---|
| 4,692,489 A * | 9/1987 | Ficker et al. ................ 524/243 |
| 6,231,936 B1 * | 5/2001 | Kozimor et al. ............ 428/34.7 |
| 6,723,759 B2 * | 4/2004 | Takenaka et al. ........... 521/40.5 |
| 6,753,373 B2 * | 6/2004 | Winowiecki ................ 524/444 |
| 6,800,710 B2 * | 10/2004 | Pelliconi et al. .......... 526/348.1 |
| 2002/0095004 A1 | 7/2002 | Takashima et al. |

FOREIGN PATENT DOCUMENTS

| | | |
|---|---|---|
| DE | 4420991 | 12/1995 |
| EP | 0 165 075 B1 | 6/1985 |
| EP | 1 211 289 A1 | 6/2002 |
| JP | 61189920 | 8/1986 |
| JP | 2001002859 | 1/2001 |

* cited by examiner

*Primary Examiner*—Edward J Cain
(74) *Attorney, Agent, or Firm*—Drinker Biddle & Reath LLP

(57) ABSTRACT

A method of manufacturing an improved clarity, low haze, low melt flow rate homopolymer polypropylene and thermoformed parts therefrom using an additive package such that the additive package alone provides the improved qualities, and process adjustments at the thermoforming stage are not required. The additive package does not contain a phosphite antioxidant, and the homopolymer polypropylene is either virgin material or virgin material mixed with at least 25 percent reground homopolymer polypropylene of the improved formulation described herein and combined with the improved clarity additive package.

20 Claims, No Drawings

CLARITY, LOW HAZE POLYMER

FIELD OF THE INVENTION

The present invention relates generally to the field of thermoformed polymers. More specifically, the present invention relates to improved clarity thermoformed polypropylene.

BACKGROUND OF THE INVENTION

Clear containers made from polymeric materials, such as deli containers, are highly desired by food producers and packagers, as well as consumers that use containers to store food and other materials/goods. These polymeric materials are typically standard thermoforming polypropylene materials that are low melt flow polymers blended with additives such as antioxidants to help with reworking unused plastic ("regrind") back into the process. The antioxidants help maintain color and melt flow of the material, and by adjusting the level of antioxidants, the color, clarity and haze of the material is affected. It is desirable to have containers that are not discolored or hazy.

Historically, thermoforming polypropylene has been difficult, compared to thermoforming other polymers such as polyvinylchloride. The temperature range in which polypropylene can be thermoformed is smaller than that for other polymers. In addition, it is standard practice to use various additive packages which typically included phosphite antioxidants to reduce discoloration and improve haze.

The current methods of improving clarity and reducing discoloration, and in particular "yellow" or "brown" haze, in clear polymer containers are to reduce process temperatures and use different nucleating agents. Readjusting processing conditions and testing or adjusting nucleating agents and additive packages require time and added costs for both polymer manufacturers and end-users.

For example, European Patent Application 1211289A1 discloses additional clarifying or nucleating agents for the reduction of haze levels after injection molding and thermoforming. U.S. Pat. No. 4,692,489 provides for blending a random copolymer resin with an antioxidant stabilizer, a primary neutralizer, and various other additives, under a nitrogen atmosphere in order to improve haze and yellowness. However, the percent haze in the resins generated was lowered only to between 38 and 40 percent, still a high value.

It would therefore be desirable to provide an improved clarity, low haze, low melt flow polymer that requires fewer additives and no major required changes or steps at the processing end.

SUMMARY OF THE INVENTION

The present invention provides a method of making an improved clarity, low haze, low melt flow homopolymer polypropylene using an improved additive package, such that costly and inefficient process adjustments at the thermoforming stage are not required. The improved additive package used in the method of making the polypropylene and resulting improved clarity, low haze thermoformed parts of the present invention eliminates the need for a phosphite antioxidant.

According to one embodiment of the present invention, the additive package used in the present invention includes at least one of each of the following: a non-phosphite antioxidant, acid scavenger, antistatic agent, and nucleating agent. One embodiment of the current invention provides a method of producing improved clarity, reduced haze thermoformed parts from a homopolymer polypropylene that is combined with an additive package that does not contain phosphite antioxidant, and then extruded.

According to the present invention, polypropylene powder and an improved clarity additive package are extruded to produce a polypropylene product that is thermoformed at temperatures associated with solid-phase thermoforming into desired articles.

According to yet another embodiment of the present invention, the improved clarity homopolymer polypropylene thermoformed sheet manufactured according to the invention is reground and recycled into the homopolymer polypropylene of the present invention, and the improved clarity and low haze of the resulting thermoformed articles is maintained. The improved clarity homopolymer polypropylene can be recycled several times without any decrease in the clarity or increase in haze of the resulting thermoformed parts.

DETAILED DESCRIPTION OF THE INVENTION

The present invention provides an improved clarity, low haze, low melt flow homopolymer polypropylene. Additives are combined with polypropylene in powder or "flake" form, and the polypropylene product is extruded and eventually thermoformed from polypropylene sheets into desired articles. The additives useful in the present invention are generally non-phosphite antioxidants, clarifying agents, antistatic agents, acid scavengers, and nucleating agents which are added in quantities between about 100 to about 2000 ppm.

Homopolymer polypropylene with xylene solubles in the range of 2.5 to 4.5 percent is useful in this invention. Virgin homopolymer polypropylene can be used, as well as virgin homopolymer polypropylene mixed with reground (recycled) improved clarity homopolymer polypropylene. The homopolymer polypropylene according to the current invention preferably has a melt flow rate that is suitable for thermoforming. Suitable melt flow rates for thermoforming range from about 1 to about 4 g/10 min. It will be apparent to those skilled in the art that polypropylene according to the present invention having a suitable melt flow rate for thermoforming can be obtained by using known methods to produce a homopolymer extruded with an additive package of the present invention.

Commercially available antioxidants that are useful in the invention are, for example, phenolic antioxidants such as Irganox® 1010 or Irganox® 3114, manufactured by Ciba Corporation. Examples of other commercially available additives that are useful in this invention are: 40% glycerol monostearate, an antistatic agent which is commercially available from, for example, Crompton Corporation or Patco Additives Division, American Ingredients Company; NA-11, a nucleating agent made by Amfine Chemical Corporation; and DHT4V, an acid scavenger supplied by Mitsui Chemicals.

Although phosphite antioxidants have been traditionally used with thermoformed polypropylene to improve properties of the material, it was surprisingly found that elimination of the phosphite antioxidant from a typical additive package resulted in significantly improved clarity and reduced haze of the resulting commercial articles. Samples of improved clarity material were produced by extruding polypropylene powder with 300 ppm DHT-4V, 1000 ppm Irganox® 1010, 500 ppm GMS 40, and 920 ppm NA-11UH to produce 99.728 weight % homopolymer polypropylene. The formulation was extruded on an OMV D80 extruder using a flat die and a 250A calender. According to one embodiment of the invention, extruding conditions are 220° C., at a line speed of 2.5 meters/minute. Depending on how it is measured, these conditions yield a melt temperature from the extruder of between 218° C. and 238° C. It will be understood by one of skill in the art that the improved clarity homopolymer polypropylene of the current invention is extruded into pellet form, which is then extruded into sheets and thermoformed, however, the current invention is not limited by the method of obtaining an extruded sheet from the polypropylene product containing the improved clarity additive package. After extrusion, the sheet is cooled and calendered, and then reheated in a thermoformer. The sheet temperature before the mold is typically between about 146° C. to 155° C.

Processing conditions are varied based on the sheet temperatures as measured after heating in an F25 thermoformer. At optimal conditions (sheet temperatures between 146° C. and 155° C., which are typical solid-phase thermoforming temperatures), the haze of samples with phosphite antioxidant ranged between 7 and 10%. At the same optimal conditions, the haze of samples without the phosphite antioxidant ranged between 3 and 5%. The haze of the various samples was measured using an instrument such as a BYK-Gardner Haze-Gard Plus.

Table 1 illustrates the haze measured at various thermoforming temperatures on lab samples and production runs of the improved clarity, low haze homopolymer polypropylene of the present invention, without phosphite antioxidant as part of the additive package, compared to homopolymer polypropylene manufactured with a phosphite antioxidant. Samples 1, 2B, 2G, 4A and 5A listed in Table 1, contained no phosphite antioxidant and the content of the additives in the homopolymer polypropylene formulation was:

1000 ppm phenolic antioxidant
  920 ppm nucleating agent
  500 ppm antistatic agent
  300 ppm acid scavenger Samples 2A, 3A and 3B contained polypropylene and the following additives, which included a phosphite antioxidant:

1000 ppm phosphite antioxidant
  500 ppm phenolic antioxidant
  920 ppm nucleating agent
  500 ppm antistatic agent
  300 ppm acid scavenger

TABLE 1

| Sample No. | Haze at Different Processing Conditions (Temperature Varied) | | |
|---|---|---|---|
| | Low | Optimized | High |
| 1 | — | 4.3 | — |
| 2A | 4.8 | 7.8 | 8.8 |
| 2B | 2.8 | 3.3 | 5.7 |
| 2G | 3.7 | 4.3 | 6.2 |
| 3A | — | 7.2 | — |
| 3B | 5.4 | 6.7 | 17.0 |
| 4A | 2.9 | 3.6 | 7.3 |
| 5A | 4.3 | 4.6 | 8.1 |

Sample 1 was formed using the standard formulation, but without phosphite antioxidant. Sample 2A was the same formulation with phosphite antioxidant. As illustrated in Table 1, elimination of the phosphite antioxidant reduced the haze of the exact same formulation by nearly half. For purposes of comparison, production runs using the Sample 2A formulation were made and tested, the results presented as Sample Nos. 3A and 3B. The production runs show that with the use of phosphite antioxidant, the haze measurements of the samples are higher.

In the lab sample formulation without the phosphite antioxidant (Sample 1), it was shown that removing the phosphite antioxidant reduced the haze of thermoformed containers. Subsequently, in Sample 2G, a lab sample reproduction of Sample 1, reduced haze containers were produced that had a better appearance due to lower color formation. Sample 4A verified that the formulation of Sample 2G produced a clearer container with lower haze and less color. Sample 2G was used to generate another production run, Sample 5A. The haze measured on all of these samples without phosphite antioxidant was within the range of approximately 3.6 to 4.6.

The temperature ranges at which these samples were tested were a "low" temperature range of 146° C. to 151° C., an "optimal" temperature range of 149° C. to 154° C., and a "high" temperature range of 151° C. to 157° C. The processing temperature during the thermoforming step also affects the haze of the sheet. Lab Sample 2G and production run Sample 4A showed a striking difference in haze from the optimal temperature range to the high temperature range. At the low temperature range, haze values were lower, but the containers were not fully formed or lacked acceptable definition, as indicated by "rounded" versus "defined" corners on the thermoformed plastic sheets.

In addition to lowered haze, the formulations of the present invention provide improved clarity. According to one embodiment of the present invention, an improved clarity grade homopolymer of 99.728 weight % homopolymer polypropylene, with xylene solubles in the range of 2.5 to 4.5 percent, was manufacturing with 300 ppm acid scavenger, 1000 ppm phenolic antioxidant, 500 ppm antistatic agent, and 920 ppm nucleating agent. Batches were made using 30 and 70 percent regrind of thermoformed improved clarity material mixed with virgin improved clarity homopolymer polypropylene prior to extrusion. When compared to the improved clarity batches containing regrinds, the haze was more than double or greater, and the clarity was substantially lower for two batches of virgin 99.678 weight % homopolymer polypropylene produced with the same additive formulation (but with an additional 1000 ppm phosphite antioxidant) that were mixed with 50 percent reground standard material.

The results of haze, clarity, and gloss testing using a BYK-Gardner Haze-Gard Plus on the standard material regrinds compared to the two improved clarity regrinds are provided in Table 2. The measurements shown in Table 2 represent the average of three measurements taken at the specified "cavities," or molding stations, on the thermoforming line.

TABLE 2

| Sample ID | Cavity | Haze | | Clarity | | Gloss |
|---|---|---|---|---|---|---|
| | | Means | Std. Dev. | Means | Std. Dev. | 60° Means |
| Improved Clarity Grade (30% regrind) | 2 | 4.16 | 0.38 | 82.40 | 2.58 | 121.20 |
| | 4 | 4.09 | 0.43 | 88.70 | 1.50 | 116.80 |
| Improved Clarity Grade (70% regrind) | 2 | 4.34 | 0.49 | 90.90 | 0.17 | 109.50 |
| | 4 | 4.68 | 0.50 | 90.40 | 0.97 | 116.60 |
| Standard Material (50% regrind) | 2 | 7.50 | 0.62 | 78.90 | 3.92 | 86.30 |
| Standard Material (50% regrind) | 2 | 9.96 | 1.49 | 74.90 | 0.65 | 77.70 |

The foregoing illustrations of embodiments of the present invention are offered for the purposes of illustration and not limitation. It will be readily apparent to those skilled in the art that the embodiments described herein may be modified or revised in various ways without departing from the spirit and scope of the invention. The scope of the invention is to be measured by the appended claims.

What is claimed is:

1. A method of manufacturing high clarity thermoformed parts substantially free of phosphite antioxidants comprising
combining at least one additive selected from the group consisting of non-phosphite antioxidants, nucleating agents, antistatic agents, clarifying agents, and acid scavengers with virgin polypropylene homopolymer to form an improved clarity homopolymer,
combining said improved clarity homopolymer with reground thermoformed polypropylene homopolymer to create a homopolymer mixture,
extruding said homopolymer mixture into sheet form, and thermoforming said homopolymer mixture.

2. The method of claim 1 wherein the content of said at least one additive in the improved clarity homopolymer is from about 100 to about 2000 ppm.

3. The method of claim 1 wherein the haze of said thermoformed parts is less than about 7% and the clarity is greater than about 80%.

4. The method of claim 1 wherein the haze of said thermoformed parts is between about 3 and 5%.

5. The method of claim 1, wherein said thermoforming is carried out at a sheet temperature between about 146° C. and 155° C.

6. The method of claim 1 wherein said reground thermoformed polypropylene homopolymer comprises at least 25 percent of the homopolymer mixture.

7. The method of claim 6 wherein the haze of said thermoformed part is less than about 7% and clarity is greater than about 80%.

8. The method of claim 1 wherein the melt flow rate of the homopolymer mixture is between about 1 and about 4 g/10 mm, and wherein the homopolymer mixture contains about 2.5 to about 4.5 percent xylene solubles.

9. High clarity thermoformed parts substantially free of phosphite antioxidants, manufactured by a process comprising combining at least one additive selected from the group consisting of non-phosphite antioxidants, nucleating agents, antistatic agents, clarifying agents, and acid scavengers, with virgin polypropylene homopolymer to form an improved clarity homopolymer, combining said improved clarity homopolymer with reground thermoformed polypropylene homopolymer to create a homopolymer mixture, wherein said homopolymer mixture has a melt flow rate of between about 1 and about 4 g/10 min; a xylene solubles content of about 2.5 percent to about 4.5 percent; and wherein said homopolymer mixture is extruded and thermoformed at a temperature between about 146° C. and about 155° C.

10. The thermoformed parts of claim 9 wherein the content of said at least one additive in the improved clarity homopolymer is between about 100 and about 2000 ppm.

11. The thermoformed parts of claim 9 wherein the haze of said high clarity thermoformed parts is less than about 7% and the clarity is greater than about 80%.

12. High clarity thermoformed parts substantially free of phosphite antioxidants, said parts having a haze of between about 3 and 5%, wherein said parts are manufactured by a process comprising combining at least one additive selected from the group consisting of non-phosphite antioxidants, nucleating agents, antistatic agents, clarifying agents, and acid scavengers, with virgin polypropylene homopolymer to form an improved clarity homopolymer, combining said improved clarity homopolymer with reground thermoformed polypropylene homopolymer to create a homopolymer mixture, wherein said homopolymer mixture is extruded, and thermoformed at a temperature between about 146° C. and about 155° C.

13. The thermoformed parts of claim 9 wherein said reground thermoformed polypropylene homopolymer comprises at least 25 percent of the homopolymer mixture.

14. The thermoformed parts of claim 13 wherein the haze of said high clarity thermoformed parts is less than about 7% and the clarity is greater than about 80%.

15. The thermoformed parts of claim 13 wherein said reground thermoformed polypropylene homopolymer comprises polypropylene homopolymer manufactured with at least one additive selected from the group consisting of non-phosphite antioxidants, nucleating agents, antistatic agents, clarifying agents, and acid scavengers, wherein the content of said at least one additive in the reground thermoformed polypropylene homopolymer is between about 100 and about 2000 ppm, and wherein said reground thermoformed polypropylene homopolymer is substantially free of phosphite antioxidants, extruded, and thermoformed at a temperature between about 146° C. and about 155° C., then reground.

16. An improved clarity homopolymer, substantially free of phosphite antioxidants, comprising reground thermoformed polypropylene homopolymer, virgin polypropylene homopolymer, and an additive package, said additive package containing a non-phosphite antioxidant, and at least one additive selected from the group consisting of nucleating agents, antistatic agents, clarifying agents, and acid scavengers.

17. The homopolymer of claim 16 wherein the content of said non-phosphite antioxidant is between about 100 and about 2000 ppm.

18. The method of claim 1 wherein said reground thermoformed polypropylene homopolymer is manufactured by combining at least one additive selected from the group consisting of non-phosphite antioxidants, nucleating agents, antistatic agents, clarifying agents, and acid scavengers with virgin polypropylene homopolymer, wherein the content of said at least one additive in the polypropylene homopolymer is between about 100 and about 2000 ppm, and wherein said polypropylene homopolymer is substantially free of phosphite antioxidants, extruded, and thermoformed at a temperature between about 146° C. and about 155° C., then reground.

19. The method of claim 1 wherein said reground thermoformed material comprises between 30% and 70% of the total polypropylene homopolyiner content.

20. High clarity thermoformed parts substantially free of phosphite antioxidants having a haze of less than about 7% and clarity of greater than about 80%, wherein said parts are manufactured by a process comprising combining at least one additive selected from the group consisting of non-phosphite antioxidants, nucleating agents, antistatic agents, clarifying agents, and acid scavengers, with virgin polypropylene homopolymer to form an improved clarity homopolymer, and combining said improved clarity homopolymer with reground thermoformed polypropylene homopolymer to create a homopolymer mixture, wherein said homopolymer mixture is extruded, and thermoformed at a temperature between about 146° C. and about 155° C.

* * * * *